United States Patent [19]

Bailey

[11] 4,450,779

[45] May 29, 1984

[54] SEED DRILLS

[75] Inventor: Alfred J. Bailey, Coventry, United Kingdom

[73] Assignee: Massey-Ferguson Services N.V., Curacao, Netherlands Antilles

[21] Appl. No.: 420,181

[22] PCT Filed: Jan. 15, 1982

[86] PCT No.: PCT/GB82/00009

§ 371 Date: Sep. 20, 1982

§ 102(e) Date: Sep. 20, 1982

[87] PCT Pub. No.: WO82/02471

PCT Pub. Date: Aug. 5, 1982

[30] Foreign Application Priority Data

Jan. 21, 1981 [GB] United Kingdom ............... 8101726

[51] Int. Cl.³ .............................................. A01C 5/06
[52] U.S. Cl. .................................... 111/52; 172/462; 172/488
[58] Field of Search ............... 111/84, 85, 52, 69, 111/25, 66, 59, 54, 56, 53-58; 172/462, 580, 407, 500, 657, 579, 454, 458, 460, 464, 465, 473, 476, 485, 487-489, 497, 506

[56] References Cited

U.S. PATENT DOCUMENTS

| | | | |
|---|---|---|---|
| 2,713,836 | 7/1955 | Ajero | 111/84 X |
| 2,756,662 | 7/1956 | Christensen | 111/84 X |
| 3,494,427 | 2/1970 | Greig et al. | 111/85 X |
| 3,570,605 | 3/1971 | Rikli | 172/462 |
| 4,149,475 | 4/1979 | Bailey et al. | 111/85 X |

*Primary Examiner*—James R. Feyrer
*Attorney, Agent, or Firm*—Robert L. Farris

[57] ABSTRACT

A seed drill comprising a frame, a series of coulters mounted on the frame at positions which are spaced apart in a transverse direction relative to the direction of operative forward motion of the drill, and actuating means comprising a beam that extends in a transverse direction and is rotatable about its own longitudinal axis and about axes perpendicular to said longitudinal axis, thrust applying means connected between the frame and the beam so as to move the beam downwards, and thrust transmitting means connected between the beam and the coulters characterized in that said thrust applying means comprises two or more levers (20) pivotally mounted on the frame (1) so that they have a common pivot axis that extends in a transverse direction and is spaced from said beam, said beam (16) being rotatably supported at the ends of said levers with at least one lever located at an intermediate region in the length of the beam, and actuator means (21) being connected between the frame (1) and each lever (20). Preferably two outermost levers are each spaced inwards from the adjacent end of the beam (16). The levers (20) are pivoted at an intermediate region and the beam is supported in spherical bearings at the ends of the levers on one side of the lever axis, and hydraulic actuators (21) are connected to the ends of the levers on the other side of the lever axis.

6 Claims, 6 Drawing Figures

SEED DRILLS

TECHNICAL FIELD

This invention relates to seed or seed and fertiliser drills.

Seed drills have already been proposed comprising a frame, a series of coulters mounted on the frame at positions which are spaced apart in a direction transverse to the direction of operative forward motion of the drill, together with actuating means capable of thrusting the coulters downwards into the ground to open furrows into which seeds can be dropped.

Such a drill has already been proposed in U.S. Pat. No. 3,494,427, having a beam mounted in a fixed position on the frame, the mounting permitting angular movement of the beam about its longitudinal axis, and a hydraulic ram being coupled to a lever arm on the beam so as to hold the beam, during each pass in a field, in a predetermined position with respect to angular movement about said axis, and thereby to cause a downward thrust to be transmitted to the coulters through resilient thrust transmitting means connected between the beam and the coulters. Said predetermined position of the beam, which determines the depths of penetration of the coulters, can be varied by an adjustable connection between the ram and the frame.

It has also already been proposed in U.S. Pat. No. 4,155,316 to provide such a drill having a beam mounted on the frame between a pair of upright hydraulic rams that are connected to the beam at their upper ends via articulated joint means so that the beams can be raised and lowered by the rams to raise and lower the coulters and can tilt from side to side if the ground profile varies across the drill. While the coulters are lowered into work, the two rams are connected in parallel and are connected through a spool valve to a hydraulic supply so that the rams can be raised and lowered together under the control of the spool valve and can move in opposite directions to one another with the displacement of hydraulic fluid from one ram to the other.

The depth of penetration of the coulters in the soil can be controlled by the pressure supplied to the rams but this is difficult using a simple spool valve. It is preferred therefore to employ removal stops that limit the downwards movements of the ram, but the beam is then held rigidly against tilting movements and does not accommodate transverse variations in ground profile. This is a particular disadvantage with wider drills because they are more likely to meet ground profile variations and yet the beam needs to be longer and will therefore tend to flex more. Such a situation is especially intolerable when the drill is used for direct-drilling work in which seed is sown into un-tilled ground and a large thrust force is applied through the beam to the coulters.

DISCLOSURE OF THE INVENTION

An object of the present invention is to provide a drill with a coulter operating mechanism including an overhead beam that is less susceptible to flexing than that of the aforesaid known drill.

This object is achieved according to the present invention by providing thrust applying means between the frame and the beam to move the beam downwards and thereby force the coulters into work through thrust transmitting means, the thrust applying means comprising two or more levers pivotally mounted on the frame so that they have a common pivot axis extending in a transverse direction, said beam being rotatably supported at the ends of said levers with at least one lever located at an intermediate region in the length of the beam, and actuator means being connected between the frame and each lever.

It will be appreciated that by rotatably supporting the beam in this manner it is still free to rotate about its own axis to balance loading between front and back rows of coulters, and to tilt end to end to accommodate transverse variations in ground profile. Furthermore, it is possible to locate one or more levers at intermediate regions in the length of the beam so as to support it against flexing.

In an embodiment of the invention using just two levers and thrust applying devices, these levers are preferably each located between the adjacent end of the beam and the centre of the beam.

The levers are preferably pivoted at their central region and the beam and actuator means are connected to opposite ends of the levers. The rotatable connection between each lever and the beam comprises a spherical bearing.

DESCRIPTION OF THE DRAWINGS

The invention will now be described by way of example with reference to the accompanying drawings of a combined seed and fertiliser drill according to the invention in which.

BEST MODE OF CARRYING OUT THE INVENTION

Figure 1:
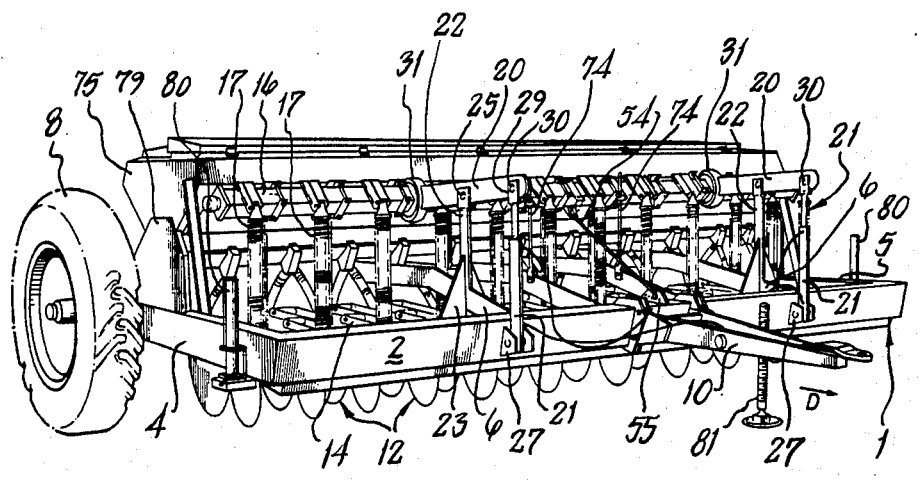
FIG. 1 is a perspective view from the front and to one side of the drill in its transport position.
Figure 2:
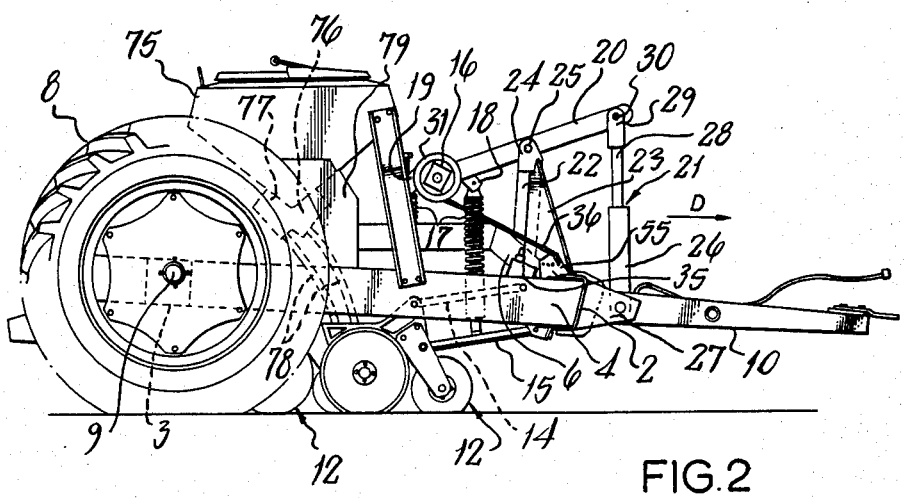
FIG. 2 is a side elevation of the drill in its working position.

The illustrated drill comprises a frame 1, the frame being generally rectangular and formed as a welded structure from U-section folded steel stock. The frame comprises front and rear beams 2, 3 respectively, left and right side beams 4, 5 and four intermediate front to rear stiffening beams 6.

Two ground engageable wheels 8 support the frame, the wheels being mounted one at each side of the frame with their axis of rotation 9 in line with the rear beam 3 of the frame.

A drawbar 10 is mounted on the front beam 2 of the frame for connection to the drawhook or drawbar of a tractor. The drawbar can be pivoted upwards to a transport position in which it is secured by a chain (not shown).

A series of triple disc coulters 12 for opening furrows in the soil are mounted on frame 1 at positions which are spaced apart in a direction transverse to the direction D of operative forward motion of the drill. Each coulter is connected via upper and lower parallel links 14, 15 to the front beam 2 so that it trails behind the beam and maintains a substantially constant attitude relative to the frame 1 as it is raised and lowered. The coulters 12 are arranged in two rows across the width of the drill with the coulters of the front row alternating with those of the back row.

The coulters are operated by an actuation mechanism comprising a transverse overhead beam 16 of square box section that is connected to each of the coulters via a resilient thrust transmitting device 17 so that downwards movement of the beam transfers a thrust to the coulters that causes them to penetrate the ground. Furthermore, the beam 16 is free to rotate about its longitudinal axis and the devices 17 are divided into two sets that lie in front of and behind the beam. The front set are connected to the beam via forwardly projecting arms 18 and are connected to the forward row of coulters, and the rear set are connected to the beam via rearwardly projecting arms 19 and are connected to the rear row of coulters. The two sets of coulters therefore exert opposing angular forces on the beam, whereby changes in loading of the coulters can be distributed between them by angular movement of the beam about its longitudinal axis.

The coulters 12 and their mounting arrangement, and the resilient thrust transmitting devices 17 and their connections to the coulters and beam 16 may all be exactly as described in U.S. Pat. No. 4,155,316 and reference should be made to this application for a more detailed description.

The coulter actuation mechanism further comprises thrust applying means to act on the beam 16 comprising two forwardly/rearwardly extending levers 20 that rotatably support the beam between them at their rear ends, and two double-acting hydraulic rams 21 that operate on the front ends of the levers 20. The levers 20 are supported so as to pivot about a common axis parallel to the axis of the beam 16. Each lever 20 is pivotally supported in its central region on an upright support 22 carried on an outer intermediate beam 6 at its lower end. The rams 21 are connected between said front ends of the levers 20 and the front beam 2 so that extension of the rams causes the levers to force the overhead beam 16 downwards.

The levers 20 are each located at an intermediate point between the adjacent free end of the beam 16 and the centre of the beam so as to help support the beam uniformly throughout its length and thereby reduce any tendency for the beam to bend when the thrust forces are applied through it. In the illustrated drill, each lever is located about a quarter of the length of the beam from each end and is aligned vertically with one of the intermediate beams 6 of the frame so that it can be pivotally supported thereon.

In alternative embodiments of the invention three or more levers 20 can be provided at spaced apart points along the length of the beam. For example, two outer levers could be provided nearer the ends of the beam than in the illustrated embodiment, and a third lever could be provided near the centre of the beam. In all embodiments the pivots 25 of the levers would lie on a common axis parallel to the beam and an individual ram would be provided to operate each, the rams all being connected in parallel. Also thrust transmitting devices 17 are connected to the beam 16 on both sides of each lever 20.

Each support member 22 is carried on top of an intermediate beam 6 and is additionally supported laterally by a triangular web 23 on each side that braces the support member and intermediate beam against the front beam 2. The support member has a forked upper end 24 in which the lever 20 is pivotally connected by a pin 25.

The cylinder 26 of each ram 21 is pivotally connected at its lower end to the front beam 2 between a pair of flanges 27 that project from the front of the beam. The piston rod 28 of the ram has a forked upper end 29 in which the lever 20 is pivotally connected by a pin 30.

The connection between each lever 20 and the overhead beam 16 is made via a spherical needle roller bearing 31 so that the beam can rotate about its own longitudinal axis to distribute coulter loading more evenly as described above and can tilt relative to the lever 20 to accommodate variations in ground profile across the width of the drill when the coulters are in work.

Figure 6:
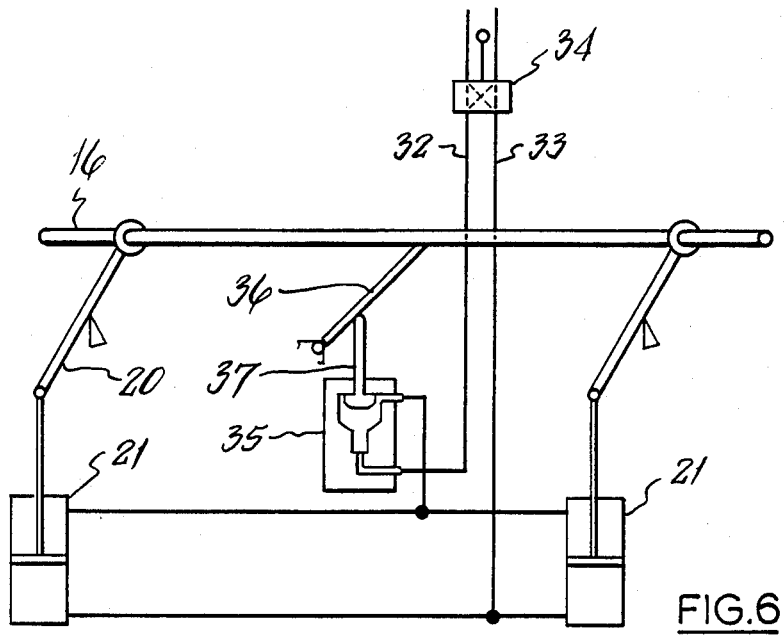
FIG. 6 is a schematic diagram of the hydraulic circuitry of the drill.

The two rams 21 are connected in parallel to fluid supply lines 32, 33 that are connectable to a tractor's hydraulic system via a spool valve 34 (FIG. 6). The spool valve 34 can be operated to connect the tractor pressure supply to line 33 so as to extend the rams and thrust the coulters into work, or can be operated to connect the pressure supply to line 32 so as to retract the rams and lift the coulters out of work. In both cases, the other line 32 or 33 is connected through the spool valve 34 to the tractor hydraulic reservoir so as to form a return flow path. The spool valve 34 also has a neutral position in which the lines 32 and 33 are closed by the valve to isolate the rams from the tractor pressure supply and reservoir. In this neutral condition, fluid can still flow between the two rams if a greater reaction force is exerted by the levers 20 on one ram as compared with the other, for example, when the ground profile varies across the width of the drill. Fluid is then forced through the parallel interconnections of the rams from the bottom of one ram to the bottom of the other ram and from the top of said other ram to the top of said one ram. The rams thus change in length relative to one another, the levers 20 change their relative angular orientations, and the over head beam 16 tilts to accommodate the variation in the ground profile, thereby balancing up the reaction forces applied to the beam 16 and levers 20.

The depth of penetration of the coulters into the soil is controlled by means comprising a plunger operated fluid flow control valve 35 connected in the supply line 32 which acts as the return flow line when the rams 21 are pressurised to lower the coulters, and a mechanical sensor linkage 36 that is connected between the front beam 2 of the drill and the beam 16 and moves with the beam to operate the plunger 37 of the control valve 35.

Figure 5:
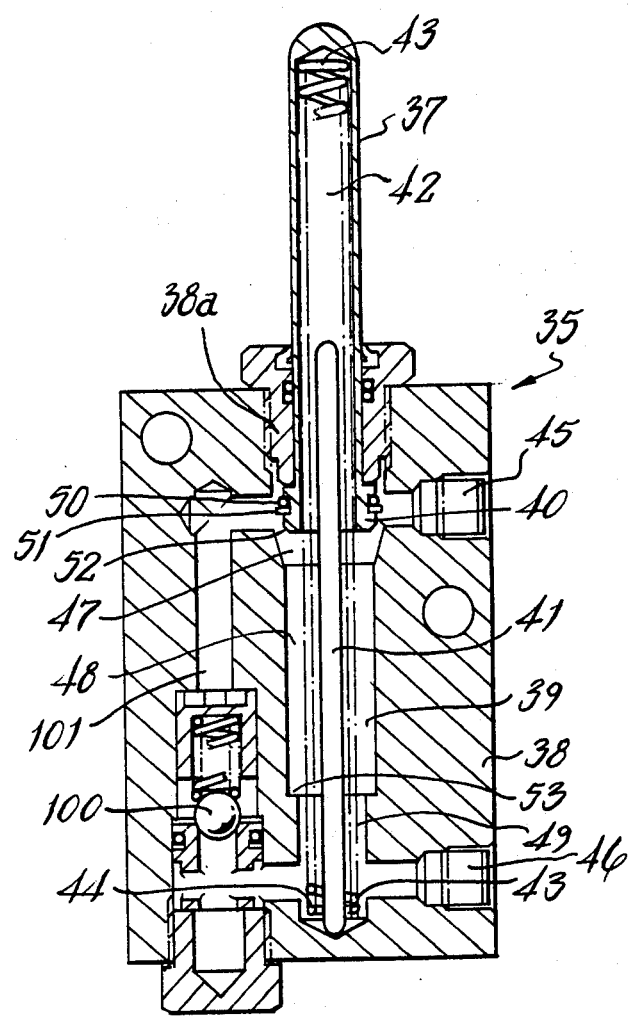
FIG. 5 is a section through the control valve of the depth control means.

The control valve 35 is shown in detail in FIG. 5 and comprises a housing block 38 formed with a blind bore 39 in which is slidably received the plunger 37 in an upright position. The upper end of the bore 39 is enlarged and threaded to receive an annular plug 38a that holds the plunger 37 captive in the housing by cooperation with the enlarged lower end 40 of the plunger. The plunger is tubular with its upper end closed, and a guide rod 41 is provided axially within the bore 39 so as to project upwards into the bore 42 of the plunger. A compression spring 43 surrounds the rod 41 and acts between a circlip 44 on the lower end of the rod 41 and the upper end of the plunger so as to urge these two members axially apart with the plunger projecting to its maximum extent from the housing.

An upper fluid port 45 is formed in the housing and opens into the enlarged upper end of the bore 39, and a lower fluid port 46 is formed in the housing at the lower end of the bore 39. The fluid supply line 32 is connected to the valve via these two ports 45, 46 as shown in FIG. 6. Thus, when the spool valve 34 is operated to lower the coulters, fluid flows from the top of the coulter rams 21 through port 45 into the upper end of the bore 39, downwards through a short inwardly tapering portion 47 of the bore, on through a cylindrical portion 48 of the bore and finally into the lower reduced diameter portion 49 of the bore and out through the port 46 to the spool valve 34 and the reservoir.

The lower enlarged end 40 of the plunger carries an O-ring seal 50 and back-up washer 51 and is adapted so that it is a sliding sealed fit within the cylindrical portion 48 of the bore 39. A taper 52 on the lower edge of the plunger aids initial engagement with this cylindrical portion of the bore. When the plunger is first depressed it moves into the tapering portion 47 of the bore and progressively restricts the flow of fluid until it is suddenly cut-off, whereupon the fluid pressure acting on the plunger forces it fully into the cylindrical portion 48 of the bore, the step 53 between the cylindrical portion 48 and the lower portion 49 serving as a stop.

When the spool valve 34 is operated to raise the coulters, fluid flows from the spool valve 34 into the lower port 46, up through the bore 39 returning the plunger 37 to the raised portion, and out through the upper port 45 to the top of the coulter rams 21.

In the event that the plunger 37 is held in the depressed state, for example, because the sensor linkage 36 does not operate correctly, the fluid pressure to raise the coulters operates a check-valve 100 in a by-pass bore 101 in the housing 38 and flows through it from the lower part 46 to the upper port 45 by-passing the intermediate portions 47, 48, 49 of the bore 39. As shown in FIG. 5, the check-valve 100 is a spring-loaded ball valve.

The sensor linkage 36 that operates the plunger 37 comprises a bar 54 that is pivotally connected at one end to a plate 55 on the front beam 2 and is held, at its other end, in sliding and pivoting engagement with an abutment 102 fixed to the beam 16. The pivotal connection to the plate 55 is made by a pin 56 that engages a hole 57 in the bar 54 and any one of a set of holes 58 formed in the plate 55, each corresponding to a different depth of coulter soil penetration as described hereafter. Said one end of the bar 54 is formed with an arm 59 alongside it such that the bar 54 and arm 59 straddle either side of the plate 55, and the pin 56 is formed with a handle 60 and insertable through the hole 57 in the bar and an aligned hole 61 in the arm 59. A lynch pin 62 engages a hole in the end of the pin 56 furthest from the handle 60 to hold it captive in the holes 57, 58, 61.

The abutment 102 fixed to the beam comprises an arcuate plate welded between the two sides 63 of a channel-section bracket 64 that is clamped to the beam by a pair of bolts 65. The web 66 of the bracket engages a face of the beam and the bolts 65 extend on either side of the beam and the bolts 65 extend on either side of the beam between the web 66 and a clamp plate 67 on the opposite side of the beam. The bar 54 extends between the sides 63 of the bracket 64 and a leaf-spring 68 urges it against the arcuate plate 56. An intermediate groove 69 formed in the leaf-spring 68 engages a pin 70 connected between the two sides 63 and the free ends 71 of the leaf-spring on either side of the pin 70 are loaded into engagement with the bar. The arcuate plate 102 has its centre of curvature coincident with the longitudinal axis 72 of the beam 16 so that rotation of the beam 16 about its own axis does not cause pivotal movement of the bar 54. Only vertical movement of the beam 16 will cause the bar 54 to pivot. Thus, as the beam 16 is lowered, it pivots the bar 54 downwards until a plate 73 on the bar engages the plunger 37 of the control valve 35 and causes the latter to block the flow of fluid, as described above. The coulter rams 21 then stop further movement of the beam.

Figure 3:
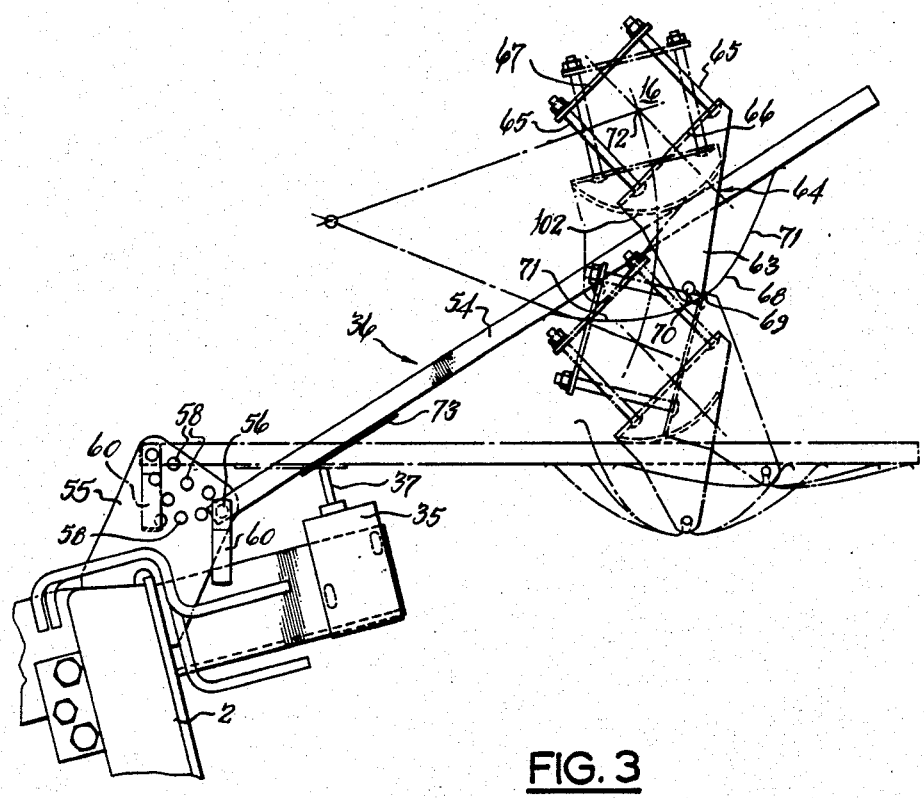
FIG. 3 is a side elevation of the coulter depth control means of the drill.
Figure 4:
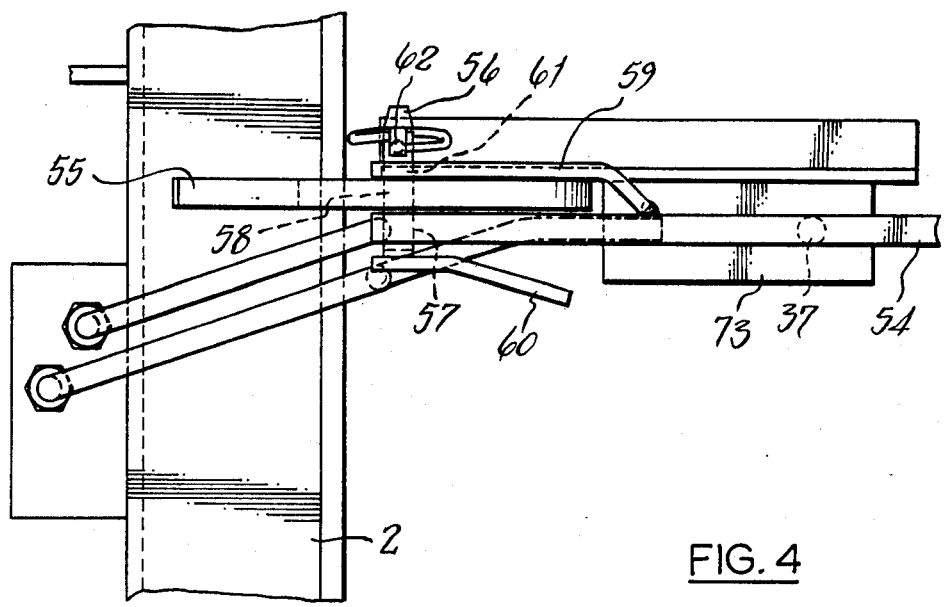
FIG. 4 is a plan view of the leading end of the depth control sensor linkage.

It will now be appreciated that the different holes 58 in the plate 55 allow the bar 54 to assume different heights and angles relative to the plunger 37 of the control valve 35 for the same position of the beam 16, thereby causing the beam 16 to operate the plunger 37 of the control valve at different heights and therefore to be stopped with the coulters at different depths in the soil. FIG. 3 shows the bar 54 connected to the plate 35 in each of the two extreme positions for the minimum depth of penetration (in full lines) and the maximum depth of penetration (in broken lines). The operator selects the position of the bar 54 to give the required penetration in the particular soil conditions, this being achieved by test drilling or lowering of the coulters before drilling.

Once the coulters have been lowered for drilling, the spool valve 34 is moved to the neutral position so as to isolate the coulter rams 21 from the tractor hydraulic supply. As seen in FIG. 1, the sensor linkage 36 is located at a central region of the beam 16 as this will give a mean position of the beam if it is tilted end-to-end because of an uneven transverse ground profile.

Other components of the drill such as the attitude control rods 74, the hopper 75, and the seed and fertilizer metering mechanisms 76, 77 will not be described in any detail because they may be substantially as described in the aforesaid British patent application No. 1,593,874. Briefly, however, the attitude control rods 74 serve to orientate the overhead beam 16 in a mean position with the front and rear rows of coulters raised equally for transport. The hopper 75 is divided internally into a front seed compartment and a rear fertilizer compartment. The metering mechanisms 76, 77 measure out seed and fertilizer respectively that is delivered to the coulters through feed tubes 78. The metering mechanisms are driven from the wheels 8 by gear trains housed in housing 79. A clutch (not shown) interrupts the drive to the metering mechanisms when the overhead beam 16 is raised. A control linkage (not shown) connects the beam 16 to the clutch.

Two retractable parking stands 80 are provided on the frame 1 and a screw jack 81 on the drawbar 10.

I claim:

1. A seed drill comprising a frame, a series of coulters mounted on the frame at positions which are spaced apart in a transverse direction relative to the direction of operative forward motion of the drill, and actuating means comprising a beam that extends in a transverse direction, thrust transmitting means connected between the beam and the coulters, and thrust applying means connected between the frame and the beam to move the beam downwards; said thrust applying means comprising at least two levers pivotally mounted on the frame with a common pivot axis extending in a transverse direction spaced from said beam and with at least one lever connected to an intermediate region in the depth of the beam, bearing means at the end of each lever that rotatably supports the beam so as to allow rotation of the beam about its longitudinal axis and tilting of the beam end-to-end relative to the levers, and actuator means connected between the frame and each lever.

2. A drill as claimed in claim 1 further characterized in that said levers (20) comprise two outermost levers each connected to an intermediate region spaced inwards from the ends of said beam (16) so that thrust transmitting means (17) are connected to the beam on both sides of each outermost lever (20).

3. A drill as claimed in claim 1 further characterized in that each actuator means (21) is connected to its respective lever (20) at one end thereof opposite said end rotatably supporting the beam (16), said common pivot axis lying between said ends of the lever.

4. A drill as claimed in claim 1 further characterized in that said bearing means comprises spherical bearings.

5. A drill as claimed in claim 1 further characterized in that said actuator means (21) comprises hydraulic devices.

6. A drill as claimed in claim 5 further characterized in that the hydraulic devices (21) are connected in parallel to hydraulic supply lines connectable to a flow control valve.

* * * * *